No. 715,824. Patented Dec. 16, 1902.
G. A. LOWRY & J. T. COWLEY.
APPARATUS FOR COMPRESSING FIBROUS OR OTHER MATERIAL.
(Application filed Aug. 1, 1900.)
(No Model.) 3 Sheets—Sheet 1.

Witnesses.
Inventors
George A. Lowry
James T. Cowley

No. 715,824. Patented Dec. 16, 1902.
G. A. LOWRY & J. T. COWLEY.
APPARATUS FOR COMPRESSING FIBROUS OR OTHER MATERIAL.
(Application filed Aug. 1, 1900.)
(No Model.) 3 Sheets—Sheet 3.

Witnesses.
Inventors
George A. Lowry.
James T. Cowley.
by Brown & Darby Attys

UNITED STATES PATENT OFFICE.

GEORGE A. LOWRY, OF CHICAGO, ILLINOIS, AND JAMES T. COWLEY, OF LOWELL, MASSACHUSETTS, ASSIGNORS, BY MESNE ASSIGNMENTS, TO PLANTERS COMPRESS COMPANY OF MAINE, A CORPORATION OF MAINE.

APPARATUS FOR COMPRESSING FIBROUS OR OTHER MATERIAL.

SPECIFICATION forming part of Letters Patent No. 715,824, dated December 16, 1902.

Application filed August 1, 1900. Serial No. 25,485. (Model.)

*To all whom it may concern:*

Be it known that we, GEORGE A. LOWRY, residing at Chicago, in the county of Cook and State of Illinois, and JAMES T. COW-LEY, residing at Lowell, county of Middlesex, State of Massachusetts, citizens of the United States, have invented a new and useful Compressing Apparatus for Fibrous or other Material, of which the following is a specification.

This invention relates to compressing apparatus for fibrous or other material.

The object of the invention is to provide means which are simple and efficient whereby bales of compressed material may be formed and detached or removed without arresting the continuous action of the bale-forming mechanism when operating at its full capacity.
Other objects of the invention will appear more fully hereinafter.

The invention consists, substantially, in the construction, combination, location, and arrangement, all as will be more fully hereinafter set forth, as shown in the accompanying drawings, and finally pointed out in the appended claims.

Referring to the accompanying drawings and to the various views and reference-signs appearing thereon,
Fig. 5 is a similar view on the line 5 5, Fig. 2, looking in the direction of the arrows.

The same part is designated by the same reference-sign wherever it occurs throughout the several views.

In the successful operation of presses for cotton or other material it is a matter of great importance to provide means whereby the formed bales may be readily removed without arresting the continuous operation of the compressing mechanism when running at full capacity in order to save time and the wear imposed on the mechanism by starting and stopping the same. It is one of the primary purposes of our invention to make provision for securing this desirable result.

In the patents of George A. Lowry, Nos. 581,600 and 581,601, granted April 27, 1897, and No. 630,369, granted August 8, 1899, is disclosed a type of compressing apparatus for fibrous or other material wherein is employed a relatively movable compressing chamber or holder and a slotted head or cap plate for one end of such chamber. In the operation of an apparatus of this type the chamber or holder is filled, by hand or otherwise, until the filling exerts an expansive pressure against the inner surface of the cap or head plate. Then by relatively moving the chamber and slotted cap or head plate and supplying the material to be compressed to the slot or slots in the cap or head plate the filling material contained in the compression-chamber exerting an expansive pressure against the inner surface of such head or cap plate bulges up into the slot or slots thereof, and presenting a rolling surface through such slots coöperates with the edges of the slots to engage the fibers of the material to be baled and draws the same into the compression-chamber through the slots in thin sheets, which sheets, by reason of the relative movement of the chamber and head plate or cap, are superposed flatwise upon each other, each layer being compressed and having the air squeezed out of the same while passing through the slot. In this manner the material to be compressed is built up endwise into a column of great density, each layer or sheet added thereto increasing to the extent of the thickness thereof the length of such column and advancing such column to the same extent through the chamber, the other end of the column finally emerging from the compressing mechanism. By continuously operating the apparatus and supplying the necessary additional material the compressed column will continue to grow in length. When a sufficient length thereof to constitute a commercial bale has been formed, such length is detached and removed.

It will be understood that in a baling apparatus of the type above referred to each layer or sheet of material while being drawn through the feed-slot in the head or cap plate is compressed and flattened and the air is expelled therefrom, and in this highly-compressed condition it is superposed upon the end of the mass contained in the chamber, and the resistance opposing the advancement of such mass through the chamber serves to apply such compressed sheet or layer to the mass under pressure, and consequently the bale forming and compressing operations are completed when the end of the compressed column emerges from the forming and compressing apparatus. It is necessary, however, to provide against the expansion endwise of the compressed column and of the detached bale.

In Patents Nos. 645,728 and 645,732, granted to George A. Lowry March 20, 1900, constructions are set forth for effecting the detachment of a length suitable to form a bale from the compressed column and for preventing the endwise expansion of the detached portion and of the remaining portion. During the operation of the staying and detaching devices set forth in said patents, however, the feed to the machine is reduced to a point below that which the machine requires when working at full capacity, thereby involving loss of time.

It is the special purpose of the present invention to provide means which are simple and efficient whereby a portion of the compressed mass of sufficient length to form a bale may be detached and removed, such detached portion, as well as the portion of the column from which it has been detached, being held against expansion and the detached portion removed without arresting or interfering with the continuous feed and operation of the forming and compressing mechanism at the full capacity thereof.

It has been explained above that a portion of the compressed column of sufficient length to form a commercial bale is detached and removed from such column after the formation and compression thereof, and hence in the operation of detaching and removing a bale it is unnecessary to overcome or oppose the baling and compressing operation, as at the point of detachment the column is no longer being subjected to the baling or forming operations.

In carrying our invention into practical operation we mount the bale detaching and staying mechanism in yielding relation to the bale forming and compressing mechanism, so that the detaching and staying devices may follow the lengthening movement of the compressed column or mass as the machine proceeds with its operation at full capacity and while such detaching and staying devices are performing their functions of detaching a bale and staying the same, as well as the compressed mass or column from which the bale is detached, against endwise expansion during the time consumed in removing the detached bale and replacing the head of the jack or other form of support against the end of that portion of the compressed column or mass from which the bale has been detached. This idea may be carried out in many specifically-different constructions and arrangements of devices, and while therefore we have shown and will now describe one construction which has been found to be efficient for the purpose desired it is to be understood that our invention is not to be limited or restricted to the exact details shown and described.

In the drawings, A designates the slotted head plate or cap, and B the compression chamber or holder, these parts being mounted for relative movement, and in association with the sleeve 9 these parts constitute the bale forming and compressing mechanism. In the particular form shown, to which, however, the invention is not limited or restricted, the head plate or cap is stationarily mounted, while the compression-chamber and sleeve are rotated. The bale-detaching devices and the staying devices, to be described more fully hereinafter, are carried by a ring 13, and in carrying out our invention this ring is supported to yield in the direction of the growth of length of the compressed column or mass. This result may be attained by supporting such rings on ball-nuts 14, carried by bolts 12. These bolts pass loosely through apertured or slotted ears 10, formed on or carried by sleeve 9, and springs 11 are interposed between the heads of said bolts and said ears, as clearly shown. Provision is made for centering the ring 13 with reference to sleeve 9. This may be effected in many ways. A simple and convenient arrangement is shown wherein the sleeve is chamfered or beveled at the lower edge thereof, as indicated at 15, and the ring 13 is provided with a correspondingly-shaped seat or edge 16, adapted when said ring is held up to its normal position by springs 11 to receive the chamfered or beveled edge of the sleeve. It is obvious that other forms of centering constructions may be employed without departure from the scope of our invention.

Figure 5:
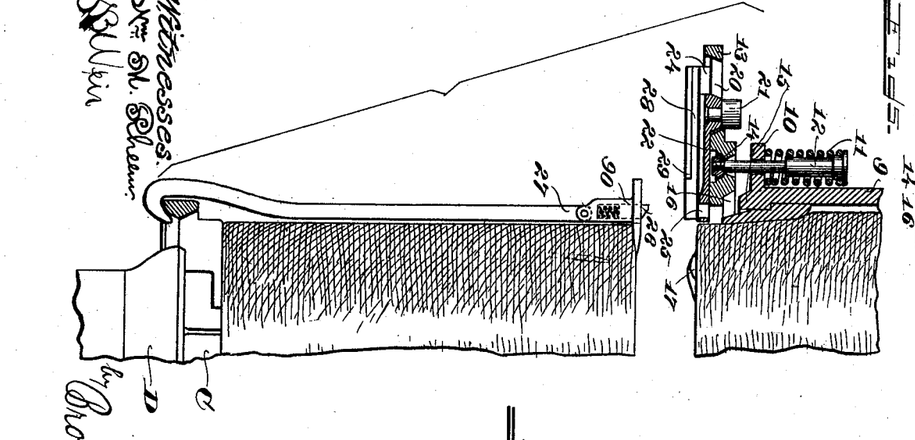

Any suitable or convenient construction and arrangement of bale detaching and staying devices may be employed—such, for instance, as described in the patents above referred to. In the particular form shown, to which, however, the invention is not limited, a bale-stay is employed which is composed of the stay part proper (indicated by reference-sign 90, Fig. 5) and a strap or holder part 27, hinged thereto and adapted to engage the bale-base C, which when the machine is in operation is held, by means of a ram or follower D, of a hydraulic jack, or otherwise, against the advancing end of the compressed column. It is obvious that any suitable or convenient form of bale-stay may be employed. The part 90 of the bale-stay is mounted to slide in ways 28, formed in the ring 13, and is operated or advanced so as to be thrust into the column of compressed material in any suitable manner, as by means of a slide 22, mounted in guides 24, formed in the ring 13, the stay detachably engaging said slide in any convenient manner, as by means of a spring-actuated catch 26, arranged to enter an opening 25 in said slide. The guide 28, in which the stay slides, does not extend the full transverse width of the ring 13, but terminates, as at 29, a sufficient distance from the inner edge of such ring to enable said stay to be pushed or advanced toward and into the column of compressed material a distance sufficient for said stay to clear its guide, thereby enabling the detached bale, with the stay applied thereto, to be removed, the detached bale being shown in Fig. 5 in the act of removal.

Figure 4:
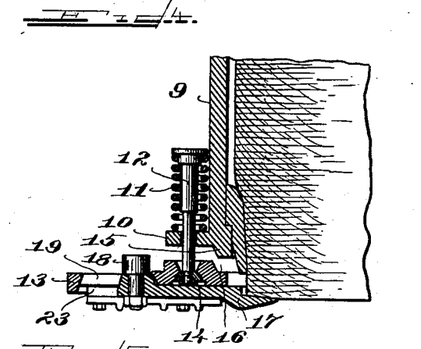
Fig. 4 is a broken detail view in section on the same plane as Fig. 1, showing the bale-detaching devices in yieldingly-displaced position.

The bale-detaching devices may be of any suitable construction and arrangement. In the form shown, to which, however, the invention is not limited or restricted, I employ knives or blades 17, (see Figs. 1 and 4,) mounted to slide in suitable ways 23, formed in the ring 13 and adapted to be projected into the compressed column.

Figure 2:
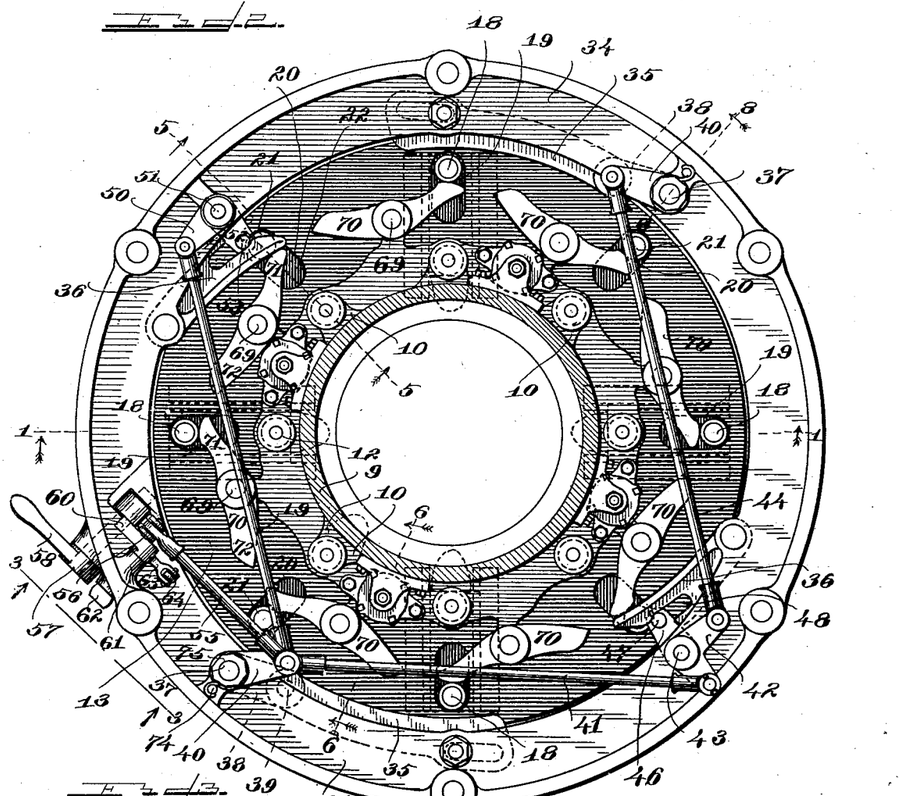
Fig. 2 is a transverse section on the line 2 2, Fig. 1, looking in the direction of the arrows.
Figure 3:
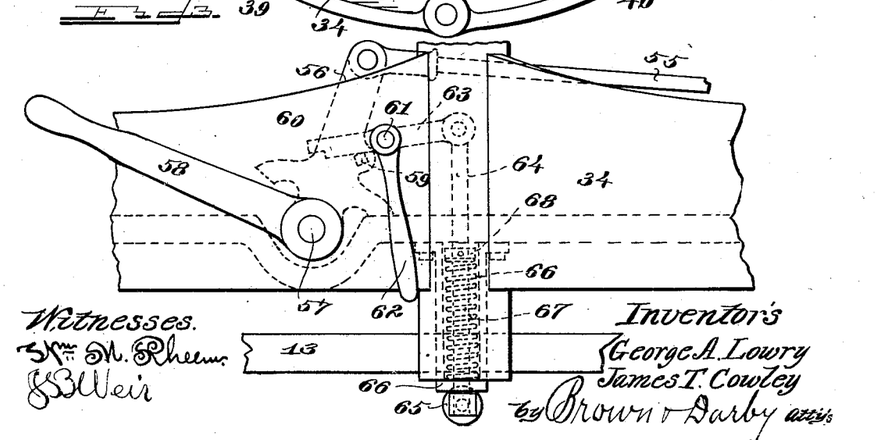
Fig. 3 is a broken detail view, in side elevation, taken from the line 3 3, Fig. 2, looking in the direction of the arrows.

The projection of the detaching devices and of the bale-staying devices may be effected in any suitable or convenient manner. A simple and convenient arrangement is shown wherein the ring 13 is provided with a series of transverse slots 19, corresponding in number and arrangement with the bale-detaching devices 17 and through which project extensions or rollers 18, formed on or carried by the slides 17. Also formed in ring 13 and alternating with slots 19 are similar slots 20, through which project extensions or rollers 21, formed on or connected to the stay-slides 22. The bale-detaching and the staying devices are advanced to their work by means of cams 35, suitably and conveniently pivoted to a stationary part 34 of the machine, which part we will call the "knock-out" ring, said cams adapted to be rocked or swung into and out of the path of the projections or rollers 18 21. Similarly the bale-detaching devices are withdrawn from their advanced position by means of other cams 36, also suitably pivoted to the knock-out ring 34 or other convenient part of the framework. The cams 35 are operated by means of crank-arms 38, pivotally mounted, as at 37, upon knock-out ring 34 and connected at the free ends thereof with the free ends of said cams 35, as indicated in Fig. 2. Arms 40 are mounted and connected to move in unison with cranks 38, and said arms at their outer or free ends are pivotally connected to the ends of rods 41 41, respectively, pivoted at the other ends thereof to the arms of a bell-crank lever 42, pivotally mounted, as at 43, upon the rocker-ring. Connected to move with the bell-crank lever 42 is an arm 46, carrying a roller or projection 47, arranged to engage in a slot 48, formed in one of the cams 36, through which means said cam may be rocked or swung, as desired. Another rod 49 is pivotally connected at one end to one of the crank-arms 40 and at the other end is connected to an arm 50, pivoted, as at 51, upon the knock-out ring. Connected to rock with arm 50 is an arm 52, carrying a roller or projection 53, engaging in a slot 54 of the other cam 36. By this construction and arrangement it will be seen that when the arm 40 is rocked in one direction the cams 35, through the system of rods and arms, are rocked or swung into the path of the rollers or projections 18 21 of the detaching and staying devices, thereby advancing said devices to their work, while simultaneously the cams 36 are withdrawn from effective position, and when said arms 40 are rocked in the other direction said cams 35 are withdrawn from the path of the rollers or projections 18 21 and the cams 36 are simultaneously advanced to effective position. Pivotally mounted upon ring 13 are a series of levers 70, each provided with a shoe 71 and a tail 72. The shoes 71 are adapted when said levers are rocked about their pivots 69 to be brought into the pathway of the rollers or projections 18 21 to engage said rollers or projections and withdraw the bale-detaching devices and stay-slides from advanced position. The levers 70 are rocked about their pivots by swinging or rocking the cams 36 into the path of the tails 72 of said levers. The cam-operating levers and rods may be actuated in any suitable or convenient manner. A simple and efficient construction is shown wherein a rock-shaft 57 is journaled in a convenient bearing formed in ring 34 and is provided with an operating-handle 58. Connected to rock with shaft 57 is a crank-arm 56, to the free end of which is pivotally connected one end of a rod 55, the other end of said rod being pivotally connected to crank-arm 40. By rocking the handle or lever 58 the desired actuation of the connecting rods and arms above described is effected, and through such actuation the operation of the bale detaching and staying devices is secured.

It will be understood from the foregoing description that when the detaching and staying devices are advanced to their work the detaching devices and also the bale-stays penetrate into the mass or column of compressed material and that the stays become detached from ring 13, while the detaching devices remain connected to said ring and remaining in advanced position serve the purpose of holding the end of the column or mass against expansion endwise while the jack D is being lowered, the detached bale removed, and the jack, with a bale-base C, returned to engagement with the end of the column or mass. During this period of time the bale forming and compressing apparatus is being operated at full capacity and without arresting or decreasing the feed thereof, the yielding support of ring 13 permitting the bale-detaching devices to remain in engagement with the end of the column, notwithstanding its increasing length due to the continuous operation of the machine at full capacity. It is desirable, therefore, that provision be made for holding the detaching devices in advanced position until the detached bale is removed and the jack, with another bale-base, advanced to engage the end of the column. This idea may be embodied in many specifically-different constructions and arrangements. A simple and efficient construction is shown, to which, however, the invention is not limited or restricted, wherein a lug 59 on the lever 56 is arranged to be engaged by a latch 60 when said lever 56 is rocked into position to cause the detaching and staying devices to be advanced to their work. The latch 60 is mounted upon a rock-pin 61, provided with an operating-handle 62. Connected to rock coincidently with latch 60 is an arm or extension 63, pivotally connected to a rod 64, provided with a roller 65 at the lower end thereof and working through a guide 66. A spring 67 is interposed between said guide and a collar 68 upon rod 64, the tension of said spring being constantly exerted in a direction to hold the latch in engaging relation with respect to lug 59. From this description it will be seen that when the lever 56 is rocked, thereby causing the detaching and staying devices to be advanced, the latch 60 engages lug 59 and holds the detaching devices in their advanced position until said latch is released by the proper manipulation of handle-lever 62.

Figure 8:
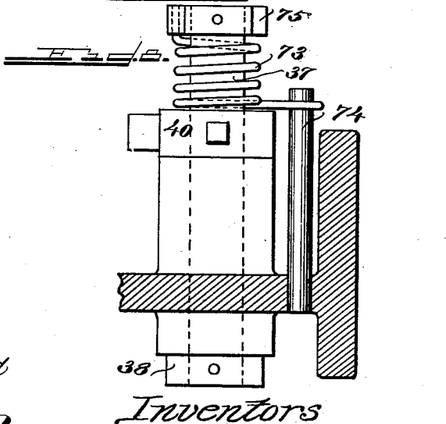
Fig. 8 is a view similar to Figs. 4, 5, and 6 on the line 8 8, Fig. 2, looking in the direction of the arrows.

It is desirable to impose a tension upon the detaching devices tending to withdraw such devices from advanced position. This idea may be carried out in many different ways. In the particular construction shown for effecting this result, to which, however, the invention is not limited, a tension is imposed upon the shaft or rod 37, to which arm 40 is connected, and opposing the rocking of said shaft or rod—as, for instance, a spring 73, (see Fig. 8,) said spring being coiled upon said shaft or rod and having one end thereof engaging a nut 75, carried by said shaft or rod 37, the other end of said spring engaging a convenient fixed part 74. From this construction it will be seen that when hand-lever 58 is actuated to advance the detaching and staying devices to their work such advancement is effected against a constantly-opposing tension, which tends to withdraw the detaching devices and the stay-slides from their advanced position, such withdrawal being prevented by the latch 60, and the moment such latch is released spring 73 acts to effect such withdrawal.

In order to guard against breakage of parts or other injury due to the failure to return the bale-base and jack into engagement with the end of the column or mass within due time after a bale has been detached and removed, or in case of failure to withdraw the detaching devices in due season from advanced position, we provide automatic means for releasing the mechanism which holds the detaching devices in advanced position when the continuously forming and lengthening column has attained a certain length. This result is attained by arranging the roller or other projection 65 upon the lower end of rod 64 in the path of ring 13, so that when said ring is advanced far enough by the lengthening mass or column it will engage said roller or projection, and thereby effect automatically a release of the latch 60, and hence permitting the spring 73 to effect the withdrawal or retraction of the detaching devices from their advanced position.

Figure 1:
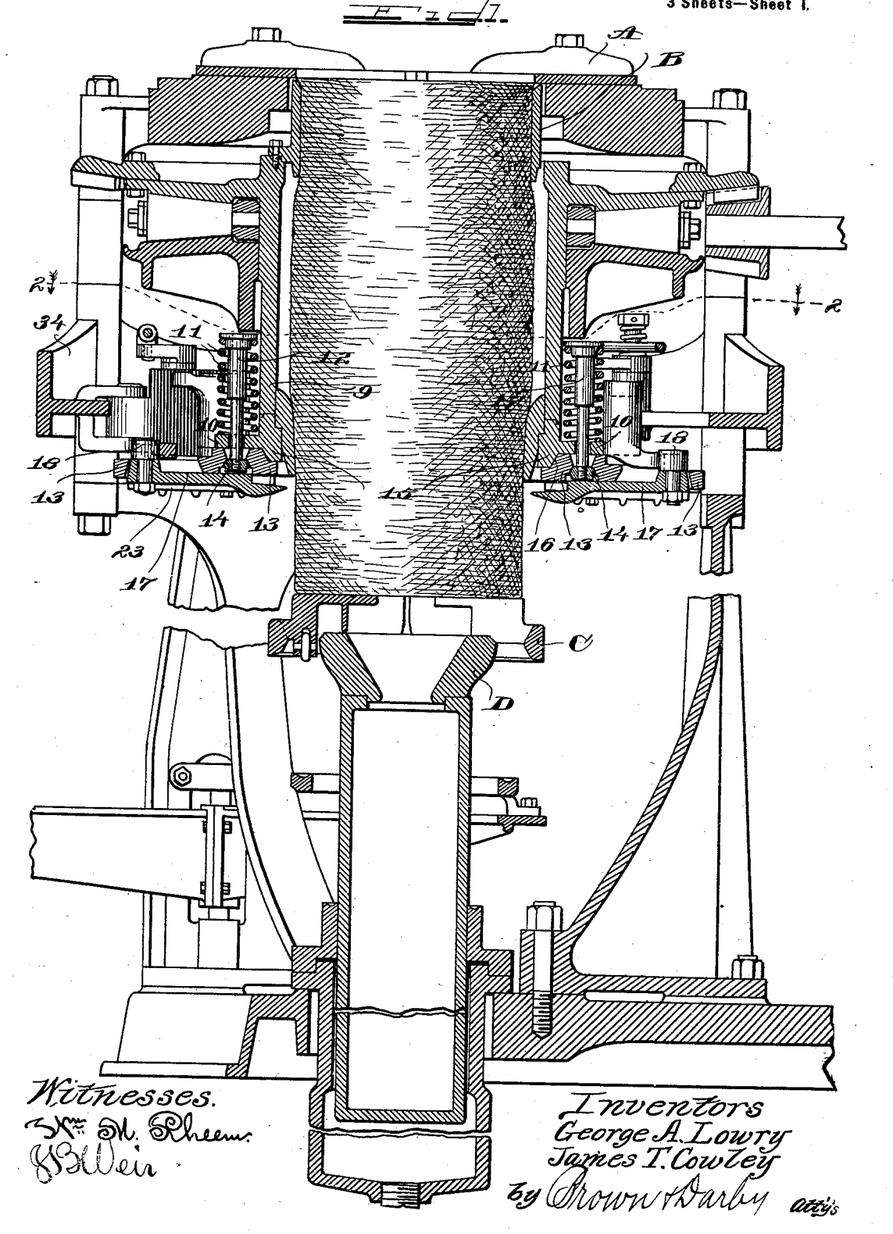
Figure 1 is a central longitudinal section on the line 1 1, Fig. 2, looking in the direction of the arrows, of one form of press, showing the application thereto of a construction embodying the principles of our invention.
Figure 6:
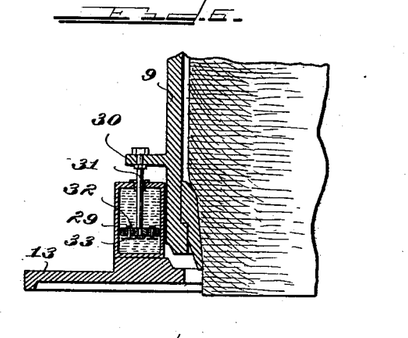
Fig. 6 is a similar view on the line 6 6, Fig. 2, looking in the direction of the arrows and showing a detached bale.
Figure 7:
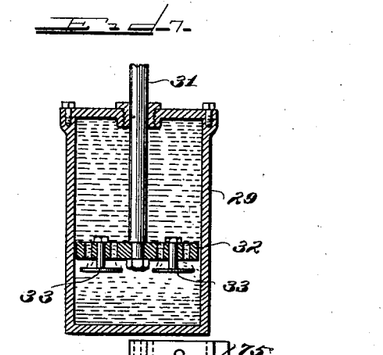
Fig. 7 is an enlarged broken detail view, in longitudinal central section, of a form of dash-pot employed in connection with our invention.

When the detaching devices are retracted or withdrawn from advanced position after the ring 13 has been displaced in front of the advancing column and a consequent tension has been imposed on springs 11, which yieldingly support said springs, the tendency of such springs is to quickly restore ring 13 and the parts supported thereby to normal position, as seen in Fig. 1. In order to avoid the danger of breakage or injury due to the action of said springs and to relieve the shock and jar, we provide a cushioning device for such ring adapted and arranged to check the return thereof to normal position and to permit the gradual and easy return. The specific embodiment of means shown for accomplishing this result which have been found efficient for the purpose, but to which the invention is not limited or restricted, comprises one or more chambers 29, carried by the ring 13, and in which operates a piston 32, having openings controlled by valves 33, and which piston is carried by a rod 31, connected to a lug or projection 30 of the sleeve 9, as clearly shown in Figs. 6 and 7. By filling the chamber 29 with a suitable medium, as water, air, or the like, we secure the effect of a dash-pot for taking up shock and jar when the ring 13 is returned to its normal position.

We are aware that it is not new to combine with pressing mechanism bale-displacing mechanism having means for removing a formed bale from the pressing mechanism while the latter is in operation and is exerting a baling action and pressure upon the formed bale; but our invention differs therefrom in that the bale when detached and while being removed is no longer subjected to the baling action and pressure of the baling mechanism.

While we have described our invention as applied to a compressing and baling apparatus of a peculiar type, it is to be distinctly understood that it is equally applicable to other forms of continuously-operating presses, the important feature being that the bale detaching and staying devices are yieldingly mounted to follow up the compressed mass of material as its continuous formation progresses, so as to enable a bale to be detached and removed without arresting the operation of the apparatus or the continuous feed thereof at full capacity.

It is obvious that many variations and changes in the details of construction and arrangement would readily occur to persons skilled in the art and still fall within the spirit and scope of our invention. We do not desire, therefore, in the broad and generic conception of our invention to be limited or restricted to the exact details shown and described; but, Having now set forth the object and nature of our invention and a construction embodying the principles thereof and having explained such construction, its purpose, function, and mode of operation, what we claim as new and useful and of our own invention, and desire to secure by Letters Patent, is—

1. In an apparatus for compressing fibrous or other material, the combination with compressing mechanism, of means for detaching a portion of the compressed material to form a bale and removing such detached portion while the compressing mechanism is running at full capacity, and means to retain the undetached portion at normal density meanwhile, as and for the purpose set forth.

2. In an apparatus for compressing fibrous or other material, the combination with compressing mechanism, of bale detaching and removing devices, means for actuating the same, said devices operating to perform their functions while the compressing mechanism is running at full capacity, the detached bale being relieved of baling action and pressure while being removed, and means to retain the undetached portion at normal density meanwhile, as and for the purpose set forth.

3. In an apparatus for compressing fibrous or other material, the combination with compressing mechanism, of bale-detaching devices yieldingly mounted with reference to said mechanism, and means for actuating said devices, as and for the purpose set forth.

4. In an apparatus for compressing fibrous or other material, the combination with compressing mechanism, of bale-detaching devices yieldingly mounted with reference to said mechanism, means for actuating said devices, and means detachably connected to said detaching devices for staying the detached bale, as and for the purpose set forth.

5. In an apparatus for compressing fibrous or other material, the combination with compressing mechanism, of detachably-connected bale detaching and staying devices yieldingly mounted with reference to said mechanism, and means for actuating said devices to detach a bale and hold the same against expansion, as and for the purpose set forth.

6. In an apparatus for compressing fibrous or other material, the combination with compressing mechanism, of bale-detaching devices yieldingly mounted with reference to said mechanism, and means for advancing said devices into the compressed material, whereby a portion thereof to form a bale is detached therefrom, and the end of the compressed mass from which the portion has been detached is held against expansion, as and for the purpose set forth.

7. In an apparatus for compressing fibrous or other material, the combination with compressing mechanism, of a support yieldingly mounted with respect to said compressing mechanism, bale-detaching devices mounted upon said support, and means for actuating said devices, as and for the purpose set forth.

8. In an apparatus for compressing fibrous or other material, the combination with compressing mechanism, of a ring or support yieldingly mounted with reference to said compressing mechanism, and having guides, and bale-detaching devices mounted in said guides, and means for actuating the same, as and for the purpose set forth.

9. In an apparatus for compressing fibrous or other material, the combination with compressing mechanism, of a yieldingly-mounted support, bale-detaching devices slidably mounted upon said support, and staying devices for the detached bale, detachably mounted upon said support, as and for the purpose set forth.

10. In an apparatus for compressing fibrous or other material, the combination with compressing mechanism, a support yieldingly mounted with reference to said compressing mechanism, and having guides formed therein, bale-detaching devices mounted to move in said guides, bale-staying devices detachably mounted in guides in said support, and means for actuating said detaching and staying devices, as and for the purpose set forth.

11. In an apparatus for compressing fibrous or other material, the combination with compressing mechanism, of bale-detaching devices, springs arranged to support said detaching devices to permit a yielding movement thereof in the line of delivery of said compressing mechanism, and means for actuating said detaching devices, as and for the purpose set forth.

12. In an apparatus for compressing fibrous or other material, the combination with compressing mechanism, of bale-detaching devices and detachably-supported bale-staying devices, a common support for said devices, said support mounted to yield in the direction of delivery of said compressing mechanism, and means for actuating said detaching and staying devices, as and for the purpose set forth.

13. In an apparatus for compressing fibrous or other material, a compressing apparatus including a compression-chamber, a ring carrying bale-detaching devices, rods arranged to support said ring, springs interposed between said rods and said compression-chamber, and means for actuating said detaching devices, as and for the purpose set forth.

14. In an apparatus for compressing fibrous or other material, a compression chamber or holder having ears, headed rods arranged to pass through said ears, springs interposed between the heads of said rods and said ears, a ring supported by said rods, and bale-detaching devices carried by said ring, and means for operating said detaching devices, as and for the purpose set forth.

15. In an apparatus for compressing fibrous or other material, the combination with compressing mechanism, of bale-detaching devices yieldingly mounted upon said mechanism to move or yield in the direction of the delivery thereof, and means for actuating said detaching devices, as and for the purpose set forth.

16. In an apparatus for compressing fibrous or other material, the combination with compressing mechanism, of bale-detaching devices yieldingly supported upon said compressing mechanism to yield in the direction of the delivery thereof, means for centering said detaching devices with reference to said compressing mechanism, and means for actuating said devices, as and for the purpose set forth.

17. In an apparatus for compressing fibrous or other material, the combination with compressing mechanism including a compression-chamber, said compression-chamber having a beveled delivery end, a ring or support, bale-detaching devices carried thereby, said ring or support shaped to receive the conical end of said compression-chamber, whereby said ring or support is centered with reference to said chamber when in retracted position, and means for yieldingly supporting said ring or support with reference to said chamber, as and for the purpose set forth.

18. In an apparatus for compressing fibrous or other material, the combination with compressing mechanism, of bale-detaching devices yieldingly mounted with reference to said compressing mechanism, and having projections, and means for engaging said projections for advancing or retracting said detaching devices, as and for the purpose set forth.

19. In an apparatus for compressing fibrous or other material, the combination with compressing mechanism, of bale-detaching devices yieldingly mounted with reference to said mechanism, means for advancing said detaching devices into the compressed material, and means for locking said devices in advanced position, as and for the purpose set forth.

20. In an apparatus for compressing fibrous or other material, the combination with compressing mechanism, of bale-detaching devices yieldingly mounted with reference to said mechanism, means for advancing said devices into the compressed material, and means for yieldingly opposing such advancement, as and for the purpose set forth.

21. In an apparatus for compressing fibrous or other material, the combination with compressing mechanism, of bale-detaching devices yieldingly mounted with reference to said mechanism, means for advancing said detaching devices into the compressed material, means for yieldingly opposing such advancement, and means for locking said detaching devices in advanced position, as and for the purpose set forth.

22. In an apparatus for compressing fibrous or other material, the combination with compressing mechanism, of bale-detaching devices yieldingly mounted with reference to said mechanism, means for advancing said detaching devices into the compressed material, and means for automatically locking said devices in advanced position, as and for the purpose set forth.

23. In an apparatus for compressing fibrous or other material, the combination with compressing mechanism, of bale-detaching devices yieldingly mounted with reference to said mechanism, means for advancing said detaching devices into the compressed material, means for locking said detaching devices in advanced position, and means for automatically releasing said lock, as and for the purpose set forth.

24. In an apparatus for compressing fibrous or other material, the combination with compressing mechanism, of bale-detaching devices yieldingly mounted with reference to said mechanism, a lever, means for actuating the same, means actuated by said lever for advancing said detaching devices into the compressed material, and a latch arranged to engage said lever to hold said detaching devices in advanced position, as and for the purpose set forth.

25. In an apparatus for compressing fibrous or other material, the combination with compressing mechanism, of bale-detaching devices, a lever having a lug, means actuated by said lever for advancing the detaching devices into the compressed material, and a latch arranged to engage said lug to hold said detaching devices in advanced position, as and for the purpose set forth.

26. In an apparatus for compressing fibrous or other material, the combination with compressing mechanism, of bale-detaching devices yieldingly mounted with respect to said mechanism, an operating-lever, means actuated thereby for advancing the detaching devices into the compressed material, a latch arranged to hold said detaching devices in advanced position, and means for automatically releasing said latch, as and for the purpose set forth.

27. In an apparatus for compressing fibrous or other material, the combination with compressing mechanism, of detaching devices mounted to yield in the direction of delivery of said compressing mechanism, means for advancing said detaching devices into the compressed material, means for locking said detaching devices in advanced position, and means arranged in the path of yielding movement of said detaching devices for releasing said lock, as and for the purpose set forth.

28. In an apparatus for compressing fibrous or other material, the combination with compressing mechanism, of bale-detaching devices mounted to yield in the direction of delivery of said compressing mechanism, means for advancing said detaching devices into the compressed material, a spring-latch arranged to hold said detaching devices in advanced position, and means arranged in the path of yielding movement of said detaching devices for releasing said latch, as and for the purpose set forth.

29. In an apparatus for compressing fibrous or other material, the combination with compressing mechanism, of bale-detaching devices yieldingly mounted with reference to said compressing mechanism, means for actuating said detaching devices, and means for cushioning the return of said detaching devices to normal position, as and for the purpose set forth.

30. In an apparatus for compressing fibrous or other material, the combination with compressing mechanism, of bale-detaching devices, and means for actuating the same, said devices mounted to yield in the direction of delivery of said compressing mechanism, and means for cushioning the return of said detaching devices to normal position, as and for the purpose set forth.

31. In an apparatus for compressing fibrous or other material, the combination with compressing mechanism, of bale-detaching devices, means for advancing and retracting said devices into and from the compressed material, a yielding support for said detaching devices, said support permitting said devices when advanced into the compressed material to follow the increasing length of such material, and, when said detaching devices are withdrawn, operating to return the same to normal position, as and for the purpose set forth.

32. In an apparatus for compressing fibrous or other material, the combination with compressing mechanism, of bale-detaching devices, means for advancing and retracting said devices into and from the compressed material, a yielding support for said detaching devices, said support operating to permit said detaching devices when advanced into the compressed material to follow the increasing length of such material, and operating to return said devices, when withdrawn from such material, and means for cushioning the return movement of said devices, as and for the purpose set forth.

33. In an apparatus for compressing fibrous or other material, the combination with compressing mechanism, of bale-detaching devices, a ring or support carrying the same, means for advancing and retracting said devices, means for yieldingly supporting said ring to permit movement thereof in the direction of the length of the compressed material, and a dash-pot for cushioning the return movement of said ring, as and for the purpose set forth.

34. In an apparatus for compressing fibrous or other material, the combination with compressing mechanism, a ring yieldingly supported with reference thereto, and carrying detaching devices, a cylinder and piston, one of said parts being connected to the compressing mechanism and the other to said ring, and forming a cushion, as and for the purpose set forth.

35. In an apparatus of the class described, a compressing mechanism, bale-detaching devices, means for actuating these parts, and a cushioned cylinder and piston, one of said parts being connected to said compressing mechanism and the other to said detaching devices, as and for the purpose set forth.

36. In an apparatus of the class described, a compressing mechanism, bale-detaching devices yieldingly connected therewith, a cylinder and piston, one of said parts connected to the compressing mechanism and the other to said detaching devices, and valve-controlled openings in said piston, as and for the purpose set forth.

37. In an apparatus of the class described, the combination with compressing mechanism including a chamber, rods spring-supported upon said chamber, a ring carried by said rods, bale-detaching devices mounted upon said ring, bale-staying devices detachably connected to said ring, and means for actuating said staying and detaching devices, as and for the purpose set forth.

38. In an apparatus of the class described, the combination with compressing mechanism including a chamber, a ring yieldingly supported upon said chamber and provided with transverse slots, bale detaching and staying devices carried by said ring, and having projections arranged to operate through said slots, and means arranged to engage said projections for advancing said detaching and staying devices into the compressing material, as and for the purpose set forth.

39. In an apparatus of the class described, the combination with compressing mechanism, of bale-detaching devices yieldingly supported with reference thereto, and having projections, pivotally-mounted cams arranged to engage said projections to advance said detaching devices into the compressed material, rods pivotally connected to said cams for operating the same, and means for yieldingly opposing the operation of said cams, as and for the purpose set forth.

40. In an apparatus of the class described, and in combination with the compressing mechanism, bale-detaching devices yieldingly connected therewith, and means for actuating said devices comprising a rock-shaft, a spring connected at one end to said shaft and at the other end to a fixed part, said spring operating to oppose the rotative movement of said shaft, and connections actuated by said rock-shaft for advancing said devices into the compressed material, and means for rocking said shaft, as and for the purpose set forth.

41. In an apparatus of the class described, a compression-chamber, a ring, rods yieldingly mounted on said chamber and supporting said ring, cylinders carried by said ring, coöperating pistons carried by said chamber, and bale detaching and staying devices connected to said ring, as and for the purpose set forth.

42. In an apparatus of the class described, a compressing mechanism, a ring yieldingly supported with reference thereto, bale-staying devices, and means for detachably locking said staying devices to said ring, as and for the purpose set forth.

43. In an apparatus of the class described, the combination with bale-compressing mechanism, of a ring yieldingly supported with reference to such mechanism, bale-stay slides carried by said ring, and bale-stays detachably engaged by said slides, and means for actuating said slides, as and for the purpose set forth.

44. In an apparatus of the class described, the combination with the compressing mechanism, of a ring yieldingly supported with reference thereto, slides mounted in said ring and having openings therethrough, guideways formed in said ring, bale-stays mounted to operate in said guideways, and having a spring-bolt arranged to detachably engage in the openings in said slides, as and for the purpose set forth.

45. In an apparatus of the class described, the combination with compressing mechanism, of bale-detaching devices yieldingly supported with reference thereto, cams arranged in sets, means for actuating said cams, one set of said cams operating to advance the detaching devices into the compressed material, and the other set of said cams operating to withdraw said detaching devices, as and for the purpose set forth.

46. In an apparatus of the class described, the combination with compressing mechanism, of bale-detaching devices having projections, cams arranged in sets, rods connecting said cams, whereby when one set of cams is operated in one direction the other set is operated in the other direction, one set of cams operating to advance the detaching devices into the compressed material, and the other set operating to retract said detaching devices, as and for the purpose set forth.

47. In an apparatus of the class described, the combination with compressing mechanism, of a ring or support, shoes pivotally mounted thereon, bale-detaching devices also carried by said ring or support, and having projections arranged to operate in the path of the ends of said shoes, cams arranged to engage said projections to advance the detaching devices into the compressed material, another set of cams arranged to operate on said shoes to withdraw said detaching devices, and connections whereby when one set of said cams is operated in one direction the other set is operated in the opposite direction, as and for the purpose set forth.

48. In a cotton-compress, the combination with means for forming a cylindrical column of compressed material by endwise pressure, of cutting mechanism for severing a completed bale from the remaining column of compressed material, and means yieldingly sustaining said cutting mechanism under pressure against said remaining column of material.

49. In a cotton-compress, the combination with means for forming a cylindrical column of compressed material by endwise pressure, of bodily-movable cutting mechanism having means for severing a completed bale from the remaining column of compressed material and for supporting the latter at one end, and means for yieldingly supporting said mechanism under pressure independently of the remaining parts of the press.

50. In a cotton-compress, the combination with the baling-chamber, and means for compressing material into one end thereof, of a bodily-movable cutting mechanism having cutters arranged to work beneath the opposite end of the baling-chamber, and means for yieldingly supporting said cutting mechanism under pressure.

In witness whereof we have hereunto set our hands, this 16th day of July, 1900, in the presence of the subscribing witnesses.

GEORGE A. LOWRY.
JAMES T. COWLEY.

Witnesses:
FREDERIC S. GOODWIN,
WM. M. RHEEM.